US010872073B1

(12) United States Patent
Gupta et al.

(10) Patent No.: US 10,872,073 B1
(45) Date of Patent: Dec. 22, 2020

(54) LOCK-FREE UPDATES TO A DATA RETENTION INDEX

(71) Applicant: Amazon Technologies, Inc., Seattle, WA (US)

(72) Inventors: Kamal Kant Gupta, Snoqualmie, WA (US); Tengiz Kharatishvili, Sammamish, WA (US); Alexandre Olegovich Verbitski, Woodinville, WA (US); Madhura Madhukar Parikh, Seattle, WA (US); Shriram Sridharan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 15/468,032

(22) Filed: Mar. 23, 2017

(51) Int. Cl.
*G06F 16/23* (2019.01)

(52) U.S. Cl.
CPC ...... *G06F 16/2336* (2019.01); *G06F 16/2358* (2019.01)

(58) Field of Classification Search
CPC ......... G06F 17/30713; G06F 17/30696; G06F 17/30716; G06F 17/3071; G06F 17/30601; G06F 17/30864; G06F 17/30412; G06F 16/358; G06F 16/34; G06F 16/338; G06F 16/2336; G06F 16/2358; G06F 16/2308; G06F 16/2343
See application file for complete search history.

(56) References Cited

U.S. PATENT DOCUMENTS

| 5,170,480 | A | * | 12/1992 | Mohan | G06F 16/27 |
| 5,812,996 | A | | 9/1998 | Rubin et al. | |
| 6,219,666 | B1 | * | 4/2001 | Krishnaswamy | G06F 8/443 |
| | | | | | 707/607 |
| 6,615,216 | B1 | | 9/2003 | Hu | |
| 7,809,891 | B2 | | 10/2010 | Schreter | |
| 8,443,375 | B2 | * | 5/2013 | Rodrigues | G06F 9/544 |
| | | | | | 719/312 |
| 2002/0091695 | A1 | * | 7/2002 | Morwood | G06F 9/5044 |
| 2003/0174572 | A1 | * | 9/2003 | Moir | G06F 9/52 |
| | | | | | 365/230.03 |
| 2004/0015510 | A1 | * | 1/2004 | Moir | G06F 9/524 |
| 2005/0021567 | A1 | * | 1/2005 | Holenstein | G06F 16/2365 |
| 2007/0130238 | A1 | * | 6/2007 | Harris | G06F 8/443 |

(Continued)

OTHER PUBLICATIONS

Maged M. Michael. Reducing the Overhead of Sharing of Shared Memory Multiprocessors. Ph.D. Dissertation. 1998. University of Rochester, Rochester, NY, USA. UMI Order No. GAX98-08902. (Year: 1998).*

(Continued)

*Primary Examiner* — James E Richardson
(74) *Attorney, Agent, or Firm* — Robert C. Kowert; Kowert, Hood, Munyon, Rankin & Goetzel, P.C.

(57) ABSTRACT

A lock-free data structure may be used to provide concurrent access to a data retention index for a data store. Different processes may obtain keys to the data retention index from the lock-free data structure. The different processes may update entries in the data retention index corresponding to the keys to identify data objects to retain in the data store. The data retention index may be evaluated to determine data objects not identified in the data retention index and reclaim portions of the data store that store the determined data objects for storing other data.

20 Claims, 10 Drawing Sheets

(56) References Cited

U.S. PATENT DOCUMENTS

| | | | | |
|---|---|---|---|---|
| 2010/0306256 A1* | 12/2010 | Blackman | ............ | G06F 12/0804 |
| | | | | 707/770 |
| 2011/0029490 A1* | 2/2011 | Agarwal | ................ | G06F 9/467 |
| | | | | 707/684 |
| 2011/0145835 A1* | 6/2011 | Rodrigues | ............... | G06F 9/526 |
| | | | | 719/312 |
| 2015/0058400 A1* | 2/2015 | Parikh | ................ | H04L 67/1002 |
| | | | | 709/203 |
| 2015/0317326 A1* | 11/2015 | Bandarupalli | ...... | G06F 12/0269 |
| | | | | 707/813 |
| 2016/0085571 A1* | 3/2016 | Kim | ................... | G06F 9/45558 |
| | | | | 718/1 |
| 2016/0110403 A1* | 4/2016 | Lomet | ................ | G06F 16/2329 |
| | | | | 707/695 |
| 2016/0147814 A1* | 5/2016 | Goel | .................. | G06F 16/2358 |
| | | | | 707/600 |
| 2016/0378658 A1* | 12/2016 | Gschwind | ............. | A45D 40/00 |
| | | | | 711/135 |
| 2019/0057027 A1* | 2/2019 | D'Halluin | ........... | G06F 12/0253 |

OTHER PUBLICATIONS

Jeremy Cole, "The Basics of the InnoDB undo Logging and History System", retrieved from https://blog.jcole.us/2014/04/16/the-basics-of-the-innodb-undo-logging-and-history-system/ on Feb. 20, 2017, pp. 1-5.

\* cited by examiner

LOCK-FREE UPDATES TO A DATA RETENTION INDEX

BACKGROUND

With the advent of sophisticated multi-core processors, multi-core processing systems provide a powerful environment for managing access to data on behalf of many different clients or processes. Oftentimes, clients or processes may concurrently access the same data sets, such as a same database, and thus techniques to facilitate expected behaviors when allowing concurrent access have been developed. For example, in database systems, different isolation levels may be implemented to provide different expected behaviors when interacting with data that may be concurrently accessed by another process. A common concern when allowing multiple different clients or processes access to the same data is that dependencies on data objects may be created. Techniques that improvement the performance of data retention strategies for efficiently managing what data may be retained and what data may be removed in a multi-processing system in light of these dependencies are highly desirable.

Figure 1:
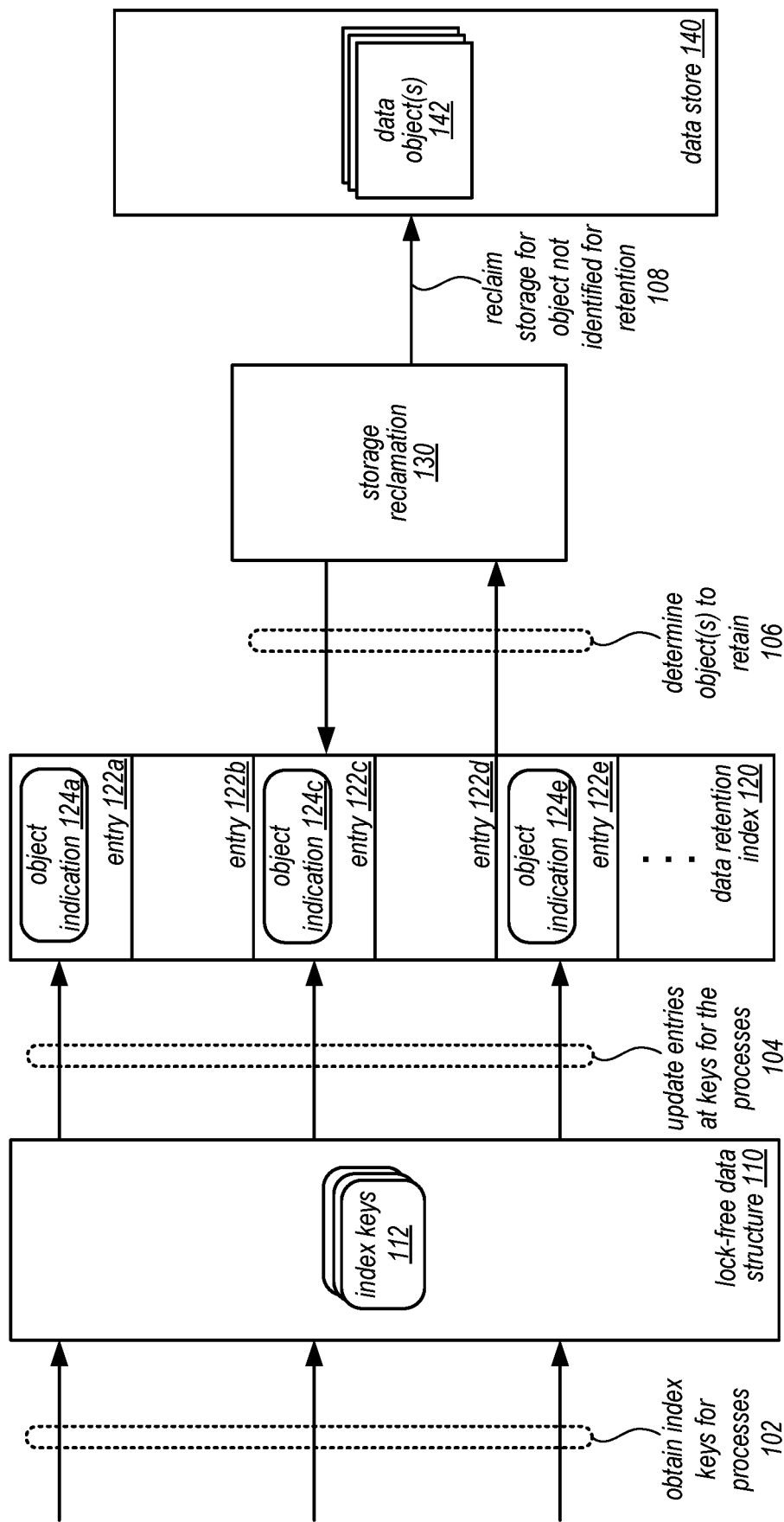
FIG. 1 is a logical block diagram that lock-free updates to a data retention index, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims.

Various components may be described as performing a task or tasks. In such contexts, the performance of tasks may be a broad recitation generally meaning "having structure that" performs the task or tasks during operation. As such, the component may be able perform the task even when the component is not currently performing that task (e.g., a computer system may be able to perform operations even when the operations are not currently being performed). In some embodiments, a component described as performing a task or tasks may be a broad recitation of structure generally meaning "having circuitry that" performs the task or tasks during operation. As such, the component can perform the task even when the component is not currently on. In general, the circuitry that forms the structure corresponding may include hardware circuits.

Various components may be described as performing a task or tasks, for convenience in the description. Reciting that a component performs one or more tasks is expressly intended not to invoke 35 U.S.C. § 112 (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of lock-free updates to a data retention index are described herein. Data stores may provide concurrent access to various data objects stored within a data store in order to allow different processes to perform tasks at overlapping times, in one embodiment. In one embodiment, objects stored within the data store may be used by different processes in order to perform different operations. For instance, while one process may no longer need a data object, another process may continue to rely upon the data object to perform operations. However, storage in such data stores is not without limit, in various embodiments. Therefore, some portions of storage that store different data objects may be reclaimed in order to create additional space for new data objects in the data store, in one embodiment. Selection of data objects to retain as well as storage for data objects that can be reclaimed may be selected according to a data retention index, in one embodiment. A data retention index may accessible to multiple different processes so that each process may independently and concurrently indicate which data objects upon which the process depends in order to continue operating. A lock-free data structure may provide keys to the data retention index to the different processes so that each process may obtain an exclusive entry in the data retention index in which to indicate what data objects should be retained for that process to operate, in one embodiment. Because the data structure that provides the keys to the data retention index may be lock-free, no one process may block access to the data retention index, which may reduce the processing time of individual processes, in one embodiment. For example, a non-uniform memory access (NUMA) multi-processing architecture may benefit from the faster access times to retrieve keys and update a data retention index as a result of the hardware-based atomic operations implementing a lock-free data structure, in one embodiment.

FIG. 1 is a logical block diagram of a system that provides lock-free updates to a data retention index, according to some embodiments. Data store 140 may be non-volatile or persistent storage device(s) (e.g., non-volatile random access memory (NV-RAM), battery-backed RAM, disk-based storage, or solid state storage) or a volatile storage device(s) (e.g., RAM) that stores one or more data object(s) 142 that may be used by one or more processes to perform different operations, in one embodiment. For example, as discussed below with regard to FIGS. 5, 8 and 9, data object(s) 142 may be undo log records used to create different versions of database records in a database that provides multi-version concurrency control to allow multiple different transactions to process concurrently with respect to the same database, in one embodiment. Similarly, other data object(s) may include graphics data or other information that may be generated or modified by one process, and used by or retained for another process, in other embodiments.

To prevent data store 140 from running out of storage space, storage reclamation operations 130 may be performed to remove or otherwise reclaim 108 storage for some data object(s) 142 that may no longer be needed, in one embodiment. In order to determine which data object(s) 142 may no longer be needed, an evaluation 106 of a data retention index 120 may be performed, in one embodiment. Data retention index 120 may include multiple different entries, such as entries 122a, 122b, 122c, 122d, 122e, and so on, which may store information that indicates which objects should be retained in data store 140, such as object indications 124a, 124c, and 124e, in one embodiment. As different operations may operate concurrently, concurrent access to data retention index 120 may be provided in order to allow different processes to add or remove object indications 124 from data retention index 120 concurrently, in one embodiment. Lock-free data structure 110 may be implemented to provide a different index key 112 for a different entry 122 in data retention index to each process so that each process may have the exclusive ability to utilize the entry in the data retention index 120 until the process completes, halts, or otherwise finishes processing, in one embodiment.

For example, in one embodiment lock-free data structure 110 may be a lock-free stack that stores index keys 112 as different nodes that can be popped off the stack in order for different processes to obtain the index keys 102, such as discussed below with regard to FIG. 5. Other lock-free data structures may be implemented in other embodiments, such as lock-free hash tables, queues, or sets, which may provide different keys 112 to different entries 122 of data retention index 120 without blocking or otherwise impeding the operation of other processes accessing data retention index 120. Processes may update 104 entries in the data retention index with object indications which may be object identifiers, locations, object values, or other information that may be used to determine which data objects are to be retained, in one embodiment. For example, the data retention index entries may store addresses, file handles, or pointers to data objects in the data store, in one embodiment. As discussed below with regard to FIGS. 8 and 9, the entries may store a value from which data objects to retain can be determined, like a minimum transaction identifier for retaining undo log records for a database, in one embodiment.

Please note, FIG. 1 is provided as a logical illustration of lock-free updates to a data retention index, and is not intended to be limiting as to the arrangement or configuration of a lock-free data structure, data retention index, storage reclamation operation or data store.

The specification first describes an example of a database service that may implement lock-free updates to a data retention index for processing transactions at a database, according to various embodiments. The example database service may host data for many different types of clients, in various embodiments. Included in the description of the example network-based database service are various aspects of the example network-based database service along with the various interactions between the database service and a separate storage service which may store the data on behalf of the database service. The specification then describes a flowchart of various embodiments of methods for lock-free updates to a data retention index. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit access requests and data schema modifications using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., request processing, transaction management, caching and storage) into tiers that may be individually and independently scalable, in one embodiment. For example, in one embodiment, each database instance in the systems described herein may include a database tier (which may include a single database engine head node and a client-side storage system driver), and a separate, storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a storage system, and distributed across multiple nodes and storage devices, in one embodiment. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space, in one embodiment. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

Figure 2:
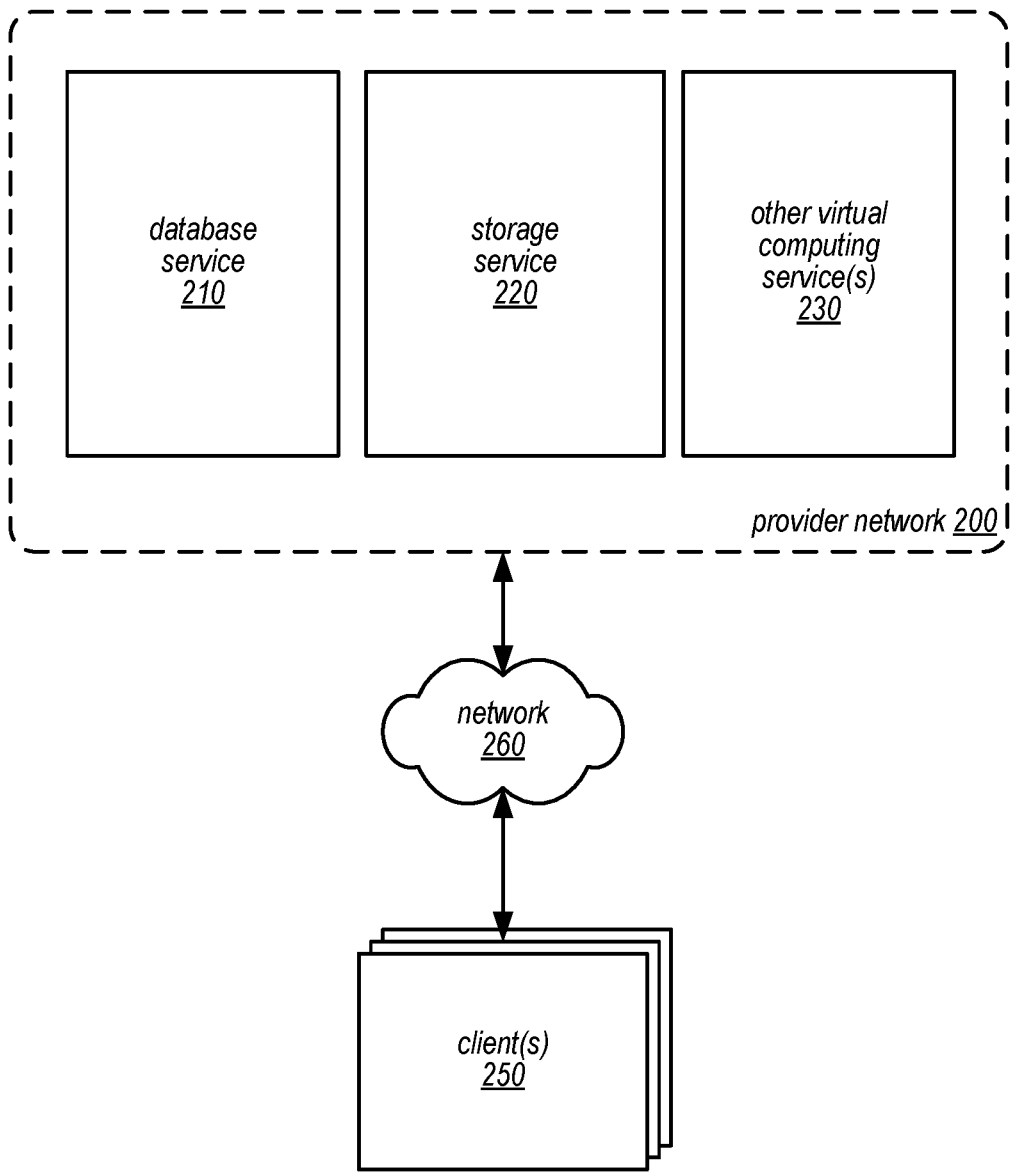
FIG. 2 is a logical block diagram illustrating a provider network implementing a network-based database service and a network-based storage service that may provide access to data for the network-based database service, according to some embodiments.

FIG. 2 is a logical block diagram illustrating a provider network implementing a network-based database service and a network-based storage service that may provide access to data for the network-based database service, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement a database service 210, a storage service 220 and/or one or more other virtual computing services 230 (which may include various other types of storage, processing, analysis, communication, event handling, visualization, and security services). Storage service 220 may be implemented as log-structured storage using a single log sequence number space, in one embodiment. Clients 250 may access these various services offered by provider network 200 via network 260. Likewise network-based services may themselves communicate and/or make use of one another to provide different services. For example, storage service 220 may store data for databases managed by database service 210, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction with respect to a database, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to network-based services platform 200 may be coordinated by client 250 and the operating system or file system on behalf of applications executing within the operating system environment.

Client(s) 250 may convey network-based services requests (e.g., a request to query a database) to and receive responses from services implemented as part of provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 230 for processing.

In some embodiments, provider network 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
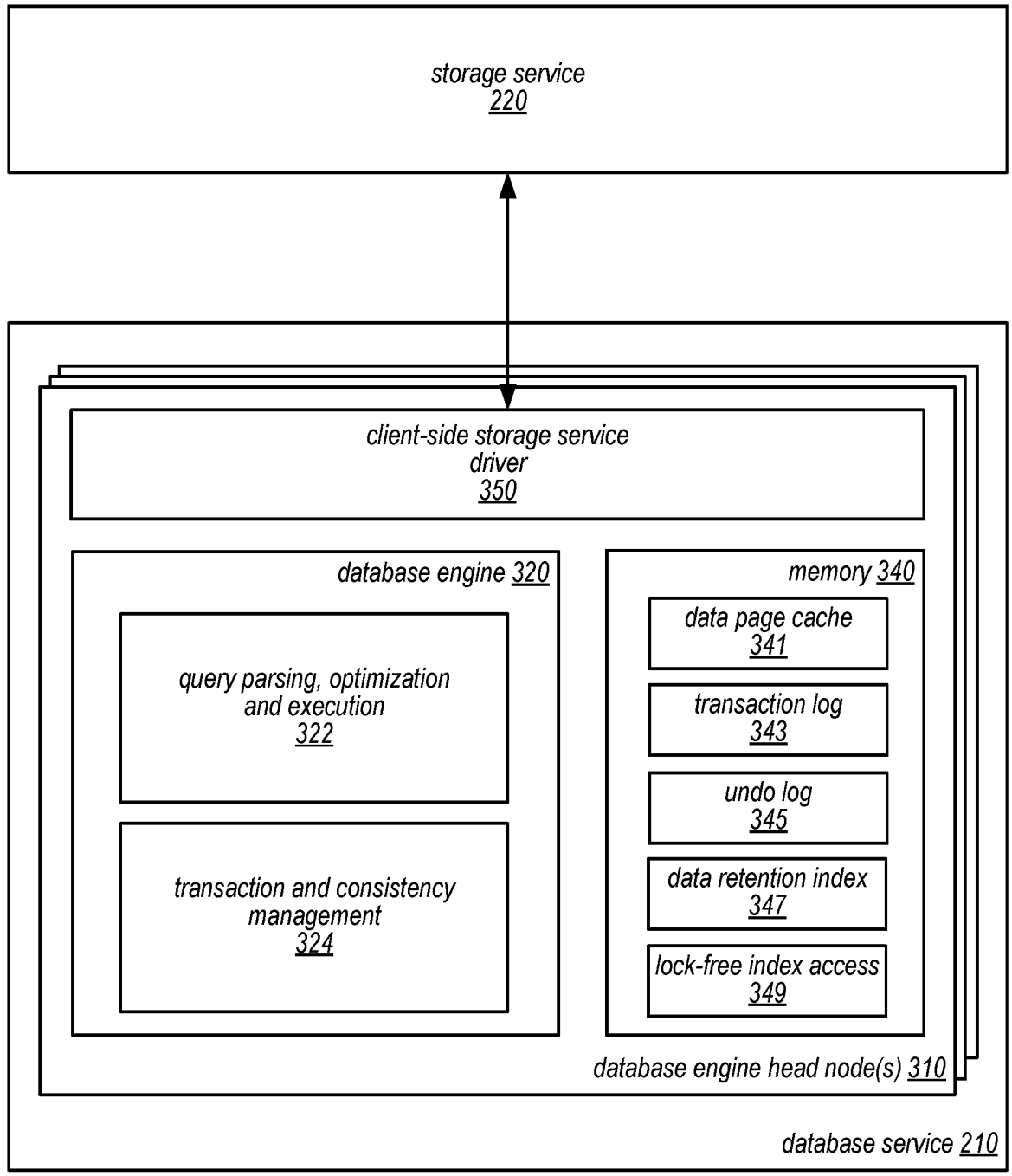
FIG. 3 is a logical block diagram illustrating various components of a database service that includes a database engine that implements lock-free updates to a data retention index, according to some embodiments.

FIG. 3 is a logical block diagram illustrating various components of a database service that includes a database engine that implements lock-free updates to a data retention index, according to some embodiments. In this example, database service 210 includes a respective database engine head node 310 for each of several databases and a storage service 220 (which may or may not be visible to the clients of the database system). In one embodiment, database engine head node 310 may be implemented on a multi-core processor implementing a non-uniform memory access (NUMA) architecture with respect to the at least one memory 340 that allows multiple different clients to establish connections with head node 310 in order to execute different transactions at different virtual CPUs (vCPUs) implemented on the multi-core processor. Clients may access a database head node 310 via network (e.g., network 260 in FIG. 2). In one embodiment, database engine head node(s) 310 may be network-addressable and accessible to the database clients directly. In one embodiment, storage service 220, which may be employed by the database service 210 to store a database volume (such as data pages of one or more databases, as well as redo log records and/or other metadata associated therewith) on behalf of database clients, and to perform other functions of the database system as described herein, may or may not be network-addressable and accessible to the database clients, in different embodiments. For example, in some embodiments, storage service 220 may perform various storage, access, change logging, recovery, log record manipulation, and/or space management operations in a manner that is invisible to database clients.

As previously noted, each database instance may include a single database engine head node 310 that receives requests (e.g., access requests, transactions, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 322 of database engine 320 may perform these functions for queries that are received from a database client and that target the database instance of which database engine head node is a component. In some embodiments, query parsing, optimization, and execution component 322 may return query responses to a database client, which may include write acknowledgements, requested data pages (or portions thereof), error messages, and or other responses, as appropriate.

Database engine head node 310 may also implement a data store, like memory 340, in various embodiments, to maintain data for performing various database engine tasks. For example, in one embodiment, memory 340 may include a data page cache 341, in which data pages that were recently accessed may be temporarily held. Other examples of data included in memory 340 to perform database engine tasks are discussed below.

As illustrated in FIG. 3, database engine head node 310 may also include a transaction and consistency management component 324, which may be responsible for providing transactionality and consistency in the database instance of which database engine head node 310 is a component, in one embodiment. For example, this component may be responsible for ensuring the Atomicity, Consistency, and Isolation properties of the database instance and the transactions that are directed that the database instance by managing a list of transactions being performed with respect to the database in transaction log 343 in memory 340, creating, updating, and reclaiming data from undo log 345 to provide multi-version concurrency control (MVCC) for transactions executed by database engine 310 and roll back any locally cached results of transactions that do not commit, in one embodiment. As discussed below with regard to FIG. 4, database engine head node 310 may implement a data retention index 347 and lock-free data structure 349 that provides access to the data retention index in order to allow for multiple transactions being processed on behalf of different clients connected to and submitting transactions to database engine head node 310 to concurrently update the data retention index 347 to indicate those undo log records that need to be maintained in undo log 345 in order to provide an isolated view of the database consistent with the time that the transaction is received, in one embodiment.

Database engine head node 310 may also include a client-side storage service driver 350, which may route read requests and/or redo log records to various storage nodes within storage service 220, receive write acknowledgements from storage service 220, receive requested data pages from storage service 220, and/or return data pages, error messages, or other responses to query parsing, optimization, and execution component 322 (which may, in turn, return them to database client), in one embodiment. Client-side storage service driver 350 may maintain mapping information about the database volume stored in storage service 220, such that a particular protection group maintaining a partition of the database volume may be determined. Read requests and redo log records may then be routed to storage nodes that are members of the protection group according to the partition of user data to which the read request is directed or to which the redo log record pertains, in one embodiment.

Figure 4:
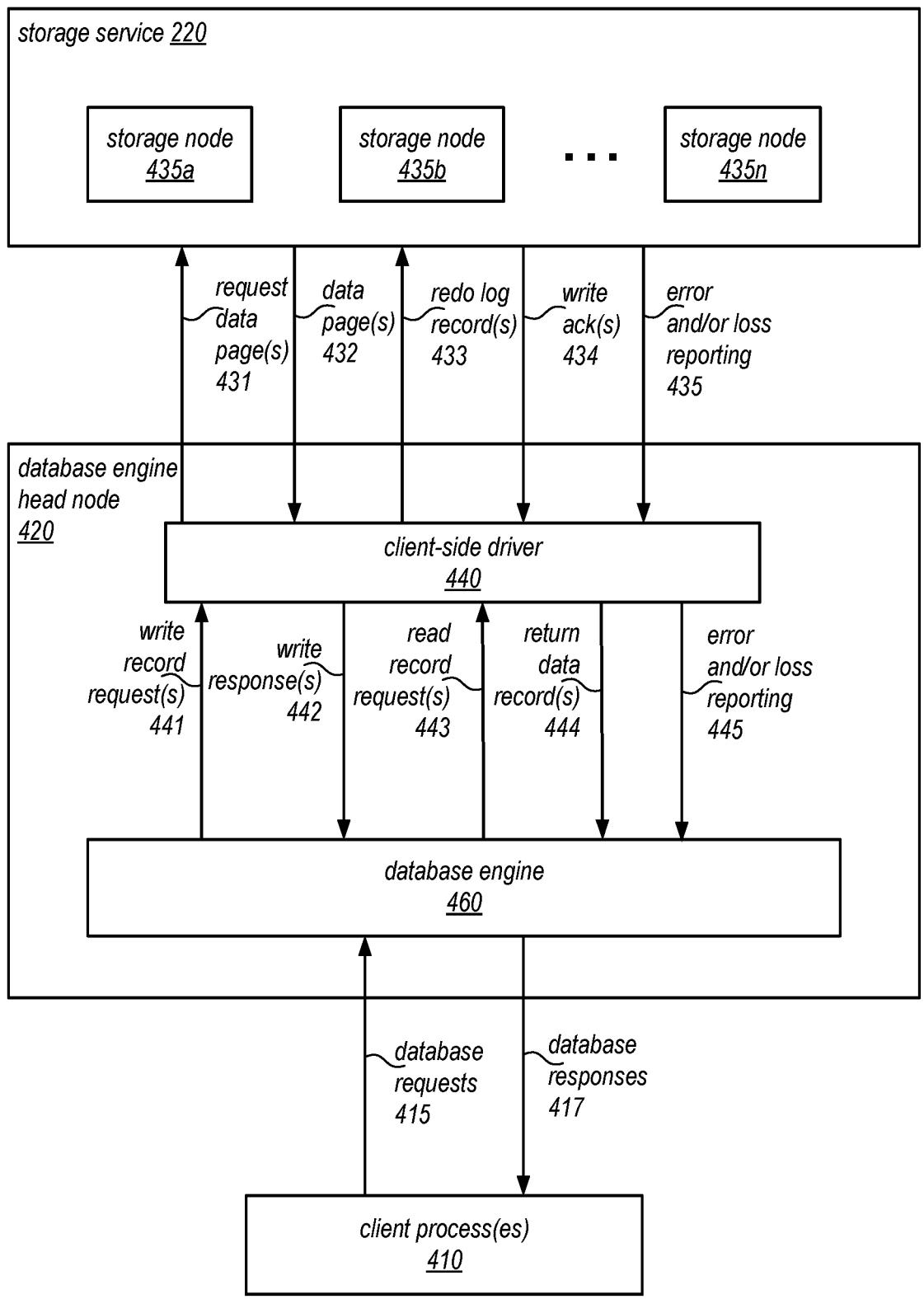
FIG. 4 is a logical block diagram illustrating the use of a separate distributed storage system in a database system, according to some embodiments.

In some embodiments, storage service 220 may implement multiple storage nodes (as illustrated in FIG. 4) which may store data for different clients as part of a multi-tenant storage service. In some embodiments, database engine head nodes 310 may be a client of storage service 220, which communicates with a database engine head node 310 over connection in a provider network 200. Each storage node may include hardware and/or software to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers), in various embodiments.

Storage nodes of storage service 220 may store data for a database managed in database service 210, such as data page(s) and segment redo log(s) for the database as part of a database volume, and may perform various segment management functions. Storage nodes may include attached SSDs, which may be persistent storage devices, in some embodiments. In some embodiments, storage nodes may implement a set of processes running on the node server's operating system that manage communication with a database engine head node, e.g., to receive redo logs, send back data pages, etc. In some embodiments, all data blocks written to the distributed storage system may be backed up to long-term and/or archival storage (e.g., in a remote key-value durable backup storage system).

FIG. 4 is a logical block diagram illustrating the use of a separate distributed storage system in a database system, according to some embodiments. In this example, one or more client processes 410 may store data to one or more databases maintained by a database system that includes a database engine head node 420 and storage service 220. In the example illustrated in FIG. 4, database engine head node 420 includes database engine 460 and client-side driver 440 (which serves as the interface between storage service 220 and database engine 460). In some embodiments, database engine may perform functions such as those performed by query parsing, optimization and execution component 322 and transaction and consistency management component 324 of FIG. 3, and/or may store log records for data pages, schema history, transaction logs and/or undo logs (such as those stored by data page cache 341, transaction log 343, undo log 345, data retention index 347, or lock-free index access 349 of FIG. 3). In various embodiments, database engine head node 420 may have obtained a volume epoch indicator or other identifier from storage service 220 granting access writes to a particular data volume, such as by sending a request to open the data volume to storage service 220.

In this example, one or more client processes 410 may send database requests 415 (which may include read and/or write requests targeting data stored on one or more of the storage nodes 435a-435n) to database tier components 460, and may receive database responses 417 from database tier components 460 (e.g., responses that include write acknowledgements and/or requested data). Each database request 415 that includes a request to write to a data page may be parsed and optimized for execution. Database tier components 460 may either access an cached version of data page(s) in data page cache 335 or may submit read record request(s) 443 to client-side driver (which may request 431 and receive 432 the appropriate data page(s) upon which the write requests are to be performed), in one embodiment. Database tier components 460 may then generate one or more write record requests 441, which may be sent to client-side driver 440 for subsequent routing to storage service 220, in one embodiment.

Client side driver may generate one or more redo log records 431 corresponding to each write record request 441, and may send them to specific ones of the storage nodes 435 of specific protection groups storing the partition user data of user data space to which the write record request pertains in storage service 220, in one embodiment. Client-side driver 440 may generate metadata for each of the redo log records that includes an indication of a previous log sequence number of a log record maintained at the specific protection group. Storage service 220 may return a corresponding write acknowledgement(s) 423 for each redo log record 431 to database engine head node 420 (e.g., to client-side driver 440), in one embodiment. Client-side driver 440 may pass these write acknowledgements to database tier components 460 (as write responses 442), which may then send corresponding responses (e.g., write acknowledgements) to one or more client processes 410 as one of database query responses 417, in one embodiment.

In this example, each database request 415 that includes a request to read a data page may be parsed and optimized to generate one or more read record requests 443, which may be sent to client-side driver 440 for subsequent routing to storage service 220. In this example, client-side driver 440 may send these requests 431 to specific ones of the storage nodes 435 of storage service 220, and storage service 220 may return the requested data pages 432 to database engine head node 420 (e.g., to client-side driver 440), in one embodiment. Client-side driver 440 may send the returned data pages to the database tier components 460 as return data records 444, in one embodiment.

In some embodiments, various error and/or data loss messages 434 may be sent from storage service 220 to database engine head node 420 (specifically to client-side driver 440). These messages may be passed from client-side driver 440 to database tier components 460 as error and/or loss reporting messages 445, and then to one or more client processes 410 along with (or instead of) a database query response 417.

In some embodiments, the APIs 431-434 of storage service 220 and the APIs 441-445 of client-side driver 440 may expose the functionality of the storage service 220 to database engine head node 420 as if database engine head node 420 were a client of storage service 220. For example, database engine head node 420 (through client-side driver 440) may write redo log records or request data pages through these APIs to perform (or facilitate the performance of) various operations of the database system implemented by the combination of database engine head node 420 and storage service 220 (e.g., storage, access, change logging, recovery, and/or space management operations). As illustrated in FIG. 4, storage service 220 may store data blocks on storage nodes 435a-435n, each of which may have multiple attached SSDs. In some embodiments, storage service 220 may provide high durability for stored data block through the application of various types of redundancy schemes, in one embodiment.

Figure 5:
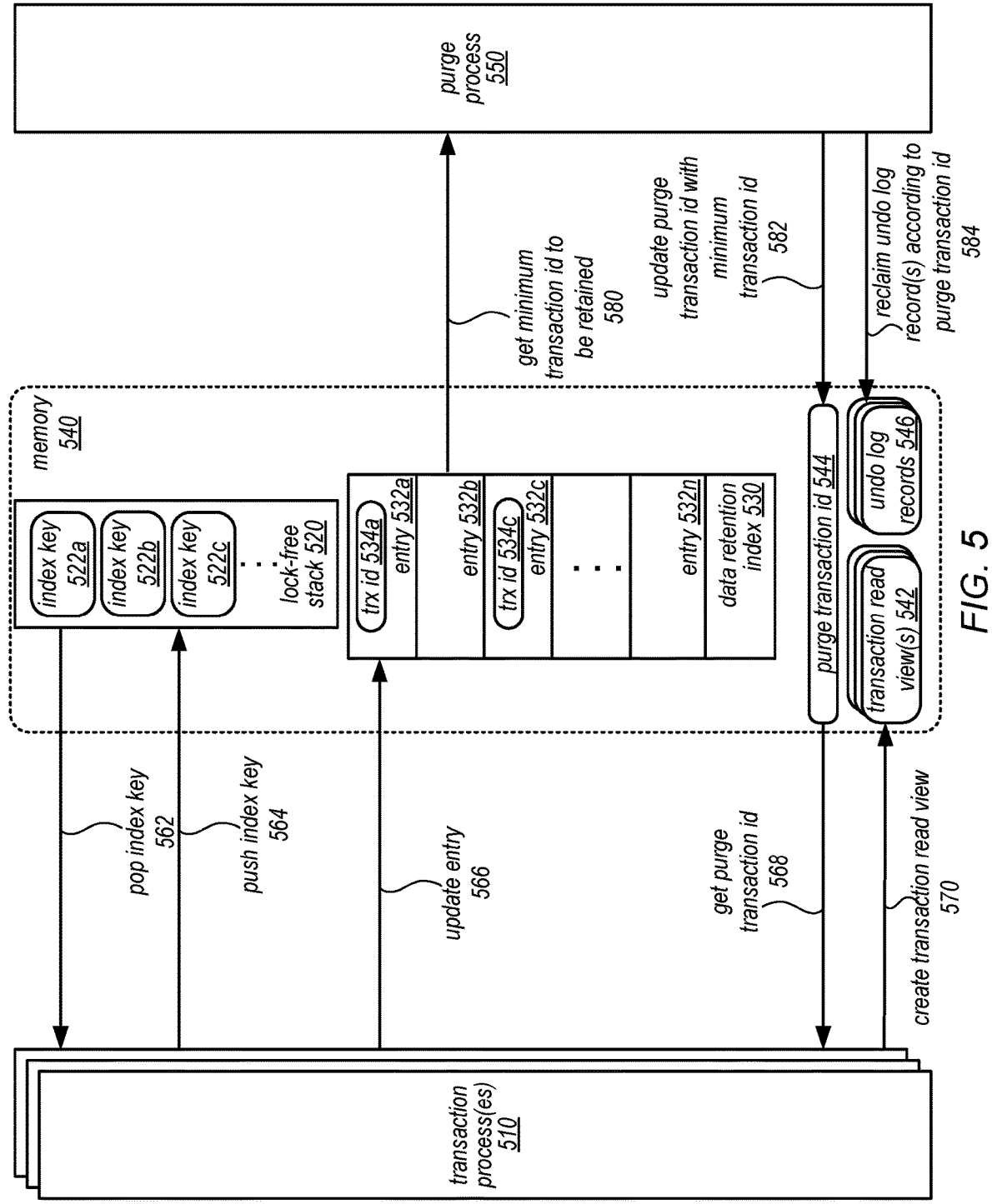
FIG. 5 is a logical block diagram illustrating updates to a data retention index using a lock-free data structure for transactions executing at a database engine, according to some embodiments

FIG. 5 is a logical block diagram illustrating updates to a data retention index using a lock-free data structure for transactions executing at a database engine, according to some embodiments. Transaction process(es) 510 may be one or more processes (or threads of a transaction execution process) that execute different transactions sent to a database engine head node from a client, in one embodiment. In at least some embodiments, a single client may submit a single transaction via a single connection to a database engine head node at a time, and thus each transaction may be executed on behalf of a different client with respect to the same database. A database transaction may be submitted to a database engine head node according to transaction semantics, in one embodiment. For example, in Structured Query Language (SQL), a transaction may be submitted with a statement "BEGIN TRANSACTION" and ended with a request to "COMMIT TRANSACTION" or "ROLLBACK TRANSACTION" in one embodiment. A transaction may be treated as a single unit of work by a database, such as database engine head node 310, so that either all of the changes, reads, or other access operations complete successfully or none of the access operations complete successfully, in one embodiment. In this way, the effects of a transaction are committed to a database together.

In database systems that allow for multiple clients to submit transactions to the same database, multi-version concurrency control (MVCC) may be implemented to ensure that each transaction can execute with respect to a consistent view of the database. A memory or other data store accessible to a database engine may include an undo log, such as undo log 345 in FIG. 3, which may store undo log records, such as undo records 546. Undo log record(s) 546 may describe changes made to records in a database (e.g., changes to value, creation of records/values, or deletion of records/values) by transactions, in one embodiment. As multiple different transactions may access some or all of the same data in the database when performing the transaction, undo log record(s) 546 may describe the changes made to the database records according to the ordering applied to transactions received at the database (e.g., according to timestamps generated for each received transaction at database engine head node 310), in one embodiment. For example, if three different transactions change the same data record value (e.g., column 1 value), undo log records may include the changes along with the identifier of the transaction that performed the changes according to the order in which the transactions were performed (e.g., first transaction—column 1='a', second transaction—column 1=and third transaction—column 1='c'). If the second transaction returns the value of column 1 as part of the transaction, the version of the database that is consistent with the second transaction is 'b.' In order to provide the appropriate result, the undo log records for column 1 would be applied until the version of the data record consistent with the view of the database for transaction 2 would be applied to return a column 1 value of 'b' (even though the value of the data record is 'c' in the database at the time transaction 2 returns the column 1 value). Each transaction may be assigned a transaction identifier (which may be a timestamp or sequence number that describes the logical ordering or scheme in which the transactions are performed, transaction 1 before transaction 2, transaction 2 before transaction 3, and so on).

As time passes, the number of undo log records 542 may grow (as the number of changes to the database increases), in one embodiment. In various embodiments, a process or thread may perform a purge or other reclamation operation to remove undo log records that are no longer need to be provide consistent views of the database for active transactions (e.g., transactions that are executing but not committed to the database). As illustrated in FIG. 5, a database engine, such as database engine 320 may implement a purge process 550 (or thread), to reclaim undo log record(s) 584 from the undo log, in one embodiment. To ensure that purge process 550 does not reclaim undo log records still needed by transaction process(es) 510, a data retention index 530 may be maintained that can determine which undo log records to retain.

Transaction process(es) 510 may concurrently access data retention index 530 to indicate which undo log records are needed to execute their respective transactions, in one embodiment. In order to ensure that each transaction process 510 has safely indicate the needed undo log records, data retention index 530 may be implemented as an array, with enough entries, such as entries 532a, 532b, 532c, and 532n, so that each possible connection to the database (e.g., the maximum number of connections) can indicate a needed undo log records in a separate entry, in one embodiment. In order to provide concurrent access to data retention index 530, a lock-free data structure, such as lock-free stack 520, may be implemented to provide each transaction process 510 with an exclusive right to one entry 532 in data retention index 530, by providing a different index key, such as index keys 522a, 522b, and 522c, to transaction process(es) 510 so that no transaction process overwrites the entry 532 of another transaction process that is still valid (e.g., the transaction is still active and executing).

Lock-free stack 520 may be implemented as a singly-linked list of nodes, that each include 2 adjacent 8B values, a retention key index value and a pointer to the next node in the stack, in one embodiment. Lock-free stack 520 may be initialized with a sentinel node that may not be popped, in one embodiment, that stores a version number as to its value, that gets updated every time a push or pop operation is performed in order to provide a valuate to prevent an ABA problem in the stack. Lock-free stack 520 may also be initialized with a number of key needs equal to the number of entries in data retention index 530 (which may be equal to the maximum number of connections that may be made to the database), in one embodiment. Lock-free stack 520 may allow transaction process(es) 510 to obtain an index key by performing a pop operation 562 and return an index key according to a push operation 564, in embodiment. The pop and push operations may include an atomic compare and swap operation, such as CMPXCHG16B, in order to compare and swap the key and pointer values in the node.

As illustrated in FIG. 5, a transaction process 510 may pop an index key 510 for an entry 532 data retention index. Until, transaction process can determine a minimum transaction identifier to indicate the log records needed to execute the transaction, transaction process 510 may get 568 the purge transaction id 544 and update the entry 566 corresponding to the key with the purge transaction id 544. For example, transaction process 510 may update entry 532 to include purge transaction id as trx id 534a. In this way, when purge process 550 scans the data retention index, purge process will not be able to advance the purge transaction id 544 beyond its current value (preventing purge process 550 from reclaiming undo log records transaction 510 may need but has not yet specified in data retention index). Transaction process 510 may determine the minimum transaction identifier needed to execute the application (according to various techniques discussed below with regard to FIGS. 8 and 9), as part of creating a transaction read view 570 (which may be maintained along with other read view(s) 542 for active transactions) and update the same entry with the minimum transaction identifier needed according to the read view for the transaction. Once transaction process 510 completes execution of the transaction, transaction process 510 may again update the entry to delete, nullify, or invalidate the trx id 534, and push the index key 564 back into lock-frees tack 520 for another process to use.

Figure 8:
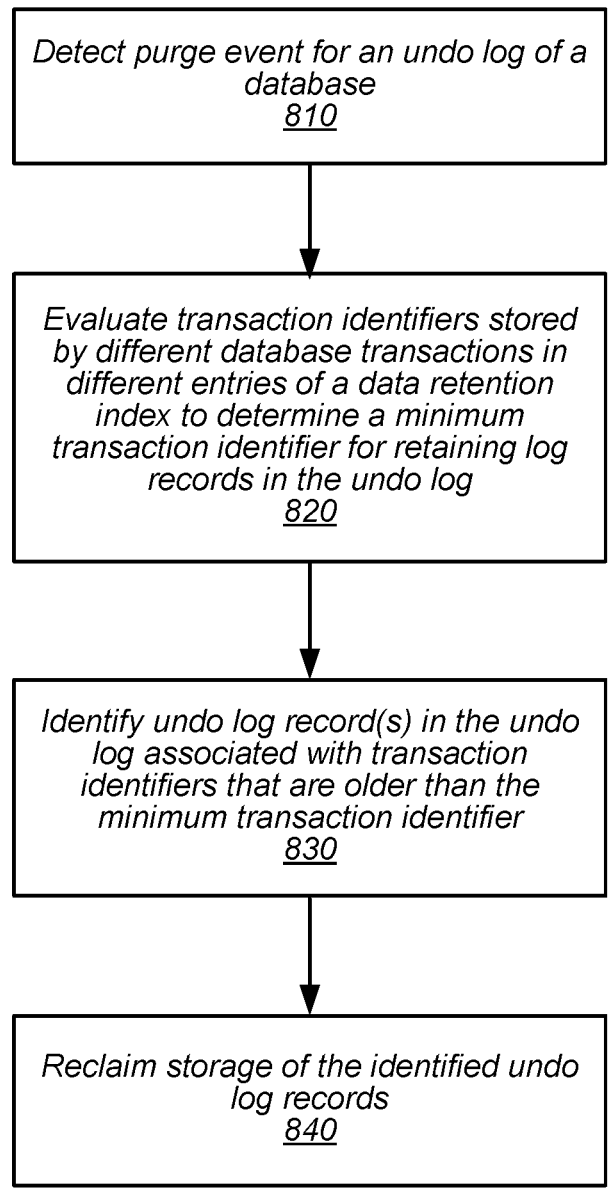
FIG. 8 is a high-level flowchart illustrating techniques to purge an undo log for a database according to data retention index updated according to a lock-free data structure, according to some embodiments.

As discussed below with regard to FIG. 8, purge process 550 may scan each entry in the data retention index in order to determine whether the lowest transaction identifier 534 (e.g., the lowest transaction id of 534a and 534c), is higher than the purge transaction identifier 544, in one embodiment. If so, then the purge transaction id 544 may be updated and log records associated with transaction identifiers less than the purge transaction id 544 may be reclaimed from memory 540.

Figure 6:
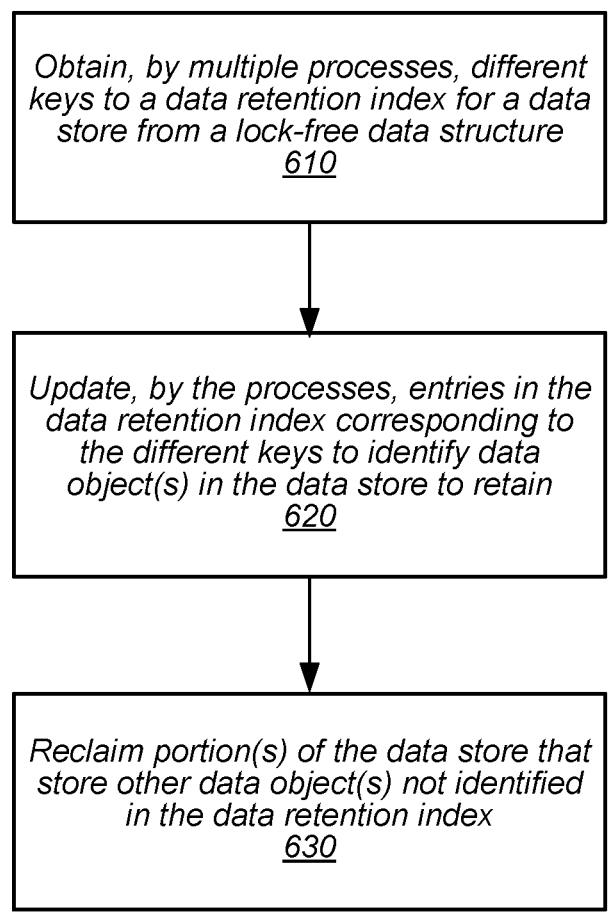
FIG. 6 is a high-level flowchart illustrating techniques to reclaim data objects from a data store not indicated in a data retention index updated according to a lock-free data structure, according to some embodiments.

The database service and storage service discussed in FIGS. 2 through 5 provide examples of a system that may perform lock-free updates to a data retention index. However, various other types of data stores (e.g., database systems that do not utilize a separate storage system) or other storage engines or storage managers that reclaim storage from data stores that store data that is concurrently accessed by different processes. FIG. 6 is a high-level flowchart illustrating techniques to reclaim data objects from a data store not indicated in a data retention index updated according to a lock-free data structure, according to some embodiments.

In one embodiment, a data store may maintain various data objects on behalf of different processing operating in a system, such as a database system or service discussed above. The data store may be volatile storage (e.g., a memory store, such as RAM) or non-volatile storage (e.g., hard-disk storage, solid state storage, or flash-based storage), in one embodiment. The different processes may operate concurrently, utilizing the data objects stored in the data store as well other data stored in the same or other locations, to execute one or multiple tasks. The retention needs of the different processes may be affected by the operation of other processes, in at least some embodiments. For example, one process may create or update data object(s) used by another process in the data store, in one embodiment. Therefore, a data retention index may be maintained to indicate which data objects may be needed by the different processes for operation, in one embodiment. If, for example, a first process attempted to delete a data object that might still be needed by a second process then the data retention index might be evaluated by the first process before deleting the data object so that the first process will detect that the data object still needs to be retained. In order to provide concurrent access to the data retention index that does not block or conflict with the operation of processes, a lock-free data structure may be implemented to provide or otherwise map keys to the data retention index to different processes.

As indicated at 610, different keys to a data retention index may be obtained by multiple processes (or threads of one or more processes) from a lock-free data structure, in various embodiments. Different types of lock-free data structures may be implemented to provide keys to different processes that access the lock-free data structure without imposing serial execution upon the processes attempting to obtain keys to the data retention index, in one embodiment. Lock-free data structures may include, but are not limited to lock-free stacks, hash tables, sets, and queues, in different embodiments. For example, a lock-free stack, as discussed above with regard to FIG. 5, may be implemented which allows different processes to push and pop keys off of the stack. In another example embodiment, a lock-free hash table may be implemented to map individual processes to different buckets that are a key to the data retention index.

As indicated at 620, the entries in the data retention index corresponding to the different keys may be updated to identify data object(s) in the data store to retain, in various embodiments. For example, the indications may be object identifiers, locations, object values, or other information that may be used to determine which data objects are to be retained, in one embodiment. For example, the data retention index entries may store addresses, file handles, or pointers to data objects in the data store. As discussed below with regard to FIGS. 8 and 9, the entries may store a value from which objects to retain can be determined, like a minimum transaction identifier for retaining undo log records for a database.

As indicated at 630, portions(s) of the data store that store other data objects not identified for retention in the data retention index may be reclaimed, in various embodiments. For example, the data objects can be marked for deletion, garbage collection, or other reuse, in one embodiment. In at least some embodiments, data objects may be deleted in groups according to the storage unit in which they are maintained (e.g., data block, page, chunk, or other data structure, such as undo log segment). Other data may be stored in or overwrite the portions of the data store identified for reclamation. Reclamation of portions of the data store may occur while new data object(s) are being indicated for retention or other objects being removed from retention in the data retention index, in some embodiments. Thus, reclamation may be performed periodically, aperiodically or in response to various reclamation events (e.g., time triggered events, utilization triggered events, or other process triggered events).

Figure 7:
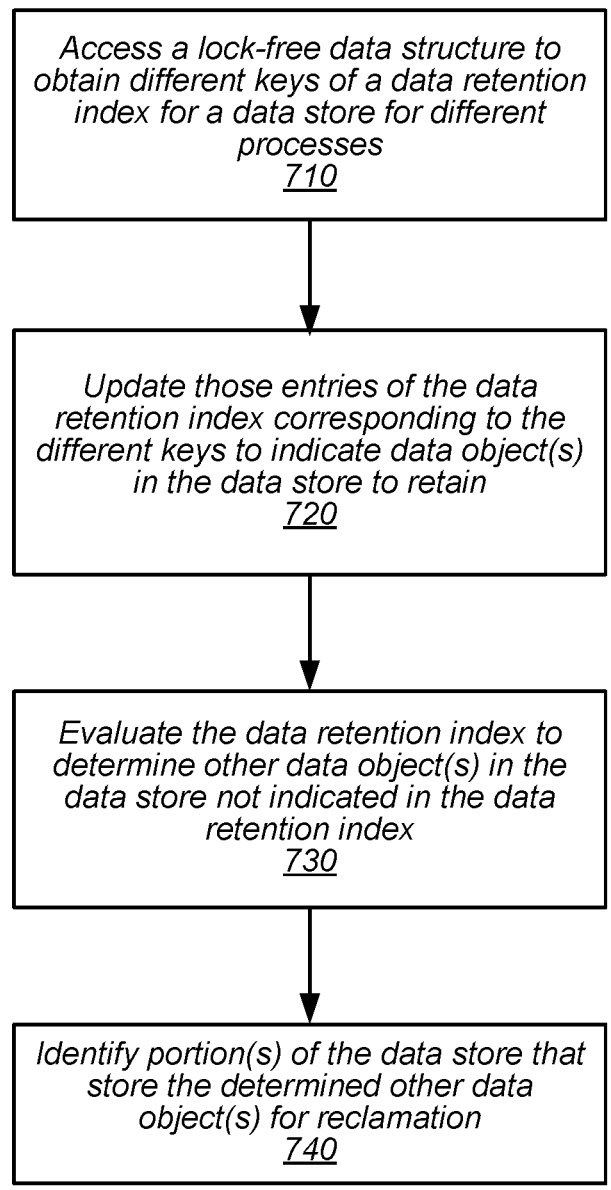
FIG. 7 is a high-level flowchart illustrating techniques to evaluate a data retention index and reclaim objects not indicated in the data retention index, according to some embodiments.

FIG. 7 is a high-level flowchart illustrating techniques to evaluate a data retention index and reclaim objects not indicated in the data retention index, according to some embodiments. As indicated at 710, a lock-free data structure may be accessed to obtain different keys of a data retention index for a data store for different processes (or different threads of one or more processes), in various embodiments. For example, each process may perform an access of the lock-free data structure in order to acquire a key to the data retention index according to the implementation of the lock-free data structure, in one embodiment. As noted earlier, lock-free data structures may be implemented in different ways. For instance, a de-queue operation may be performed by a process to access a lock-free queue that stores keys to the data retention index and obtain exclusive rights to a key in the data retention index, in one embodiment. When the process is finished updating the data retention index (e.g., when the process no longer needs to indicate data object(s) to retain), then the process may en-queue the key for subsequent use by another process. Multiple processes may access the lock-free data structure concurrently.

As indicated at 720, those entries of the data retention index corresponding to the different keys may be updated to indicate the data object(s) in the data store to retain, in some embodiments. Similar to element 620 discussed above, the indications may be object identifiers, locations, object values, or other information that may be used to determine which data objects are to be retained, in one embodiment. For example, the data retention index entries may store addresses, file handles, or pointers to data objects in the data store. As discussed below with regard to FIGS. 8 and 9, the entries may store a value from which objects to retain can be determined, like a minimum transaction identifier for retaining undo log records for a database, in one embodiment.

As indicated at 730, the data retention index may be evaluated to determine other data object(s) in the data store not indicated in the data retention index, in some embodiments. For example, the data retention index may be scanned so that at each entry with an indicator is evaluated, adding retained data objects to a retention map or list that is applied during reclamation for the data store. In some embodiments, data objects may be associated with a logical ordering scheme (e.g., time stamps, sequence numbers, etc.) so that the determination of the other data objects not indicated for retention may be performed by determining a point in the logical ordering scheme up to which data objects need not be retained. For example, a change log or other set of log records may describe changes to other data (e.g., user data in database, files or folders in a file system, etc.), in one embodiment, and the determination of the data object(s) not indicated in the data retention index may be performed by determining the point in the change log up to which the log records do not have to be retained.

As indicated at 740, portion(s) of the data store may be identified that store the other data object(s) for reclamation, in various embodiments. A tombstone or other maker may be included in the data object itself, in one embodiment. A garbage collection list, available storage map, or other list of free storage may be updated to include the portions of the data store (e.g., storing address, storage units, or other identifiers of the portions of the data store), in one embodiment.

As discussed above, determining which data to retain on behalf of multiple processes can be performed in various scenarios. Database systems, such as the database service described above with respect to FIGS. 2-5 for example, may implement a data retention index to determine when to keep or reclaim storage for different database system operations, such as an undo log used to implement multi-version concurrency control (MVCC) for the database. FIG. 8 is a high-level flowchart illustrating techniques to purge an undo log for a database according to data retention index updated according to a lock-free data structure, according to some embodiments.

As indicated at 810, a purge event may be detected for an undo log of a database, in various embodiments. In one embodiment, a purge event may be triggered according to a timer or other measurement indicating a period of time since a purge of the undo log was last performed (e.g., trigger a purge event every 10 seconds). The state of the undo log may be evaluated to detect a purge event, in one embodiment. For instance, the amount of data stored in the undo log, the number of undo log records, or the available space for storing the undo log may be compared with purge event threshold, triggering a purge event (e.g., trigger a purge event when the undo log stores more than 1,000 undo log records). Purge events may be triggered during low database engine utilization (e.g., when query rates or processor utilization falls below threshold value), in one embodiment.

As indicated at 820, transaction identifiers stored by different database transactions in different entries of a data retention index may be evaluated to determine a minimum transaction identifier for retaining log records in an undo log, in various embodiments. For example, the data retention index may be scanned so that each entry is read, in one embodiment. Out of all of the transaction identifiers read from each of the entries, the lowest transaction identifier may be set as the purge transaction identifier. If, for instance, a transaction identifier 8732 is determined to be the minimum transaction identifier (as all other transaction identifiers in the data retention index are greater than 8732), then the purge transaction identifier may be updated to 8732 (which may move up the retention point in the logical ordering of versions generated by different transactions that need to be retained).

As indicated at 830, undo log record(s) in the undo log associated with transaction identifiers that are older than the minimum transaction identifier may be identified, in various embodiments. For example, if the minimum transaction identifier has a value of 10,999, then the undo log records of the undo log may be scanned so that any undo log record with a transaction identifier value less than 10,999 may be identified, in one embodiment. As indicated at 840, storage of the identified undo log records may be claims, in some embodiments. For example, in one embodiment, undo log records may be stored in pages of undo log records. When an undo log record is identified that undo log record may be marked for reclamation. When all of the undo log records in a page are marked for reclamation, then the page may be identified as available for storing new data (e.g., new undo log records). In one embodiment, identified undo log records may be deleted, marked as available, or otherwise overwritten with different data.

Figure 9:
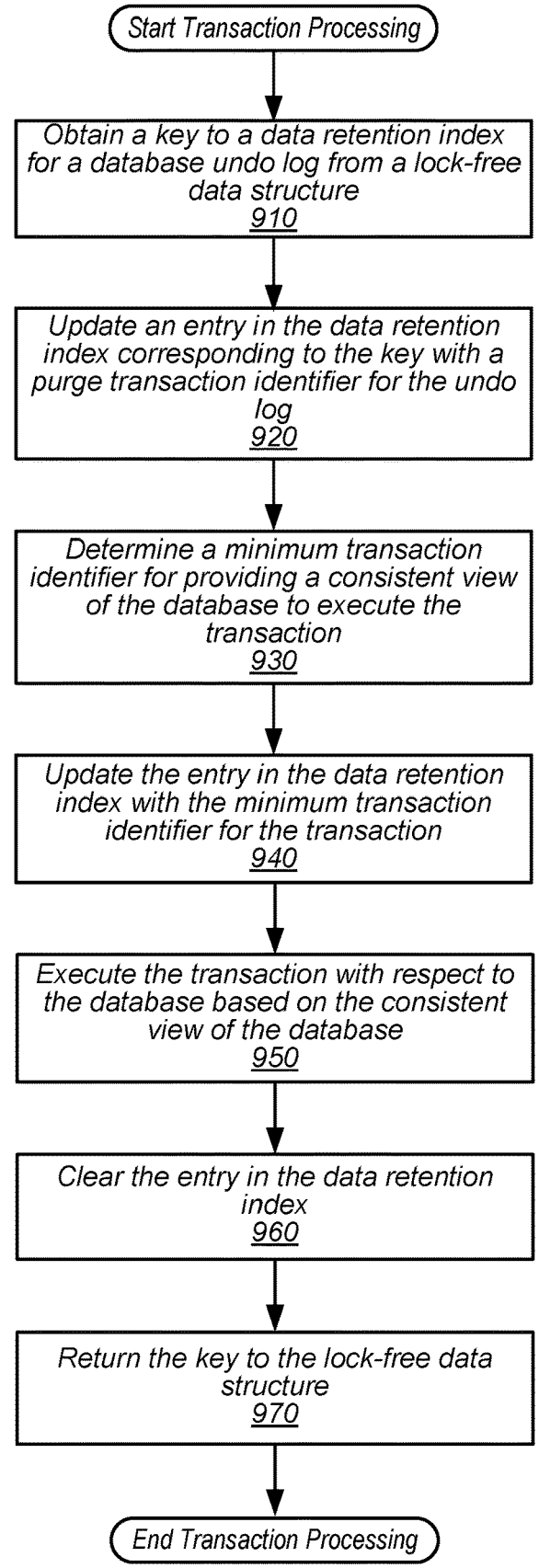
FIG. 9 is a high-level flowchart illustrating techniques to update a data retention index for database transaction according to a lock-free data structure, according to some embodiments.

FIG. 9 is a high-level flowchart illustrating techniques to update a data retention index for database transaction according to a lock-free data structure, according to some embodiments. As indicated at 910, upon starting processing for a database transaction directed to a database, a key may be obtained to a database retention index for an undo log of the database from a lock-free data structure, in various embodiments. For example, a lock-free stack, such as discussed above with regard to FIG. 5, may be implemented to map data retention index keys to different transaction processes (or threads of different processes), in one embodiment. A pop method, function, or operation may be invoked to pop a key node off of the lock-free stack, such as a pop method, function, or operation that executes an atomic compare and swap (e.g., CMPXCHG16B) instruction to return a node from the lock-free stack, in one embodiment. An atomic compare and swap operation may either complete entirely or not all, and thus, if the atomic compare and swap fails to complete as part of the pop method, function, or operation, the pop method, function, or operation may not receive a node of the lock-free stack that has been also given to a different process (or thread of a process) that invoked the pop, method, function, or operation concurrently. In this way, keys to the data retention index may be obtained for different processes concurrently, without blocking the operation of any one process (e.g., by implementing a mutex, semaphore, or other locking mechanism that prevents other processes from obtaining a key to the data retention index). Other lock-free data structures may be implemented in other embodiments, and thus the previous example is not intended to be limiting.

A purge process or other process or component that performs a purge operation for an undo log may maintain an indication of the current set of transactions that may need to be visible in the undo log in order to execute active transactions, in one embodiment. In order to prevent a needed undo log record from being purged prior to a determination of what transaction views are needed by the transaction is made between the time when a key to the data retention index is obtained and the minimum transaction identifier is determined for the transaction, a placeholder value that would prevent any needed undo log records from being purged may be included in the entry of the data retention index corresponding to the key, in one embodiment. For example, as indicated at 920, an entry in the data retention index corresponding to the key may be updated with a purge transaction identifier for the undo log, in various embodiments. A purge transaction identifier may be maintained in a snapshot, view, or location (e.g., within the undo log or other portion of a data store) that is accessible to a process for reads, in one embodiment. The transaction process may then read the purge transaction identifier and write the purge transaction identifier to the entry. In this way, a purge operation will at least retain the same undo log records maintained at the time the transaction begins processing (as the purge operation would not reclaim log records associated with a transaction value higher than the purge transaction identifier).

As indicated at 930, a minimum transaction identifier for providing a consistent view of the database needed to execute the transaction may be determined, in various embodiments. For example, a read view for the transaction may be created that identifies which transactions are visible, and thus applicable to data accessed (e.g., read or written) by the transaction. A transaction table or list may be accessed to create the read view that identifies all active transactions for the database at the time the transaction begins processing, in one embodiment. Based on the active transactions, the read view may identify a minimum transaction identifier (sometimes referred to as an upper limit, in some embodiments), which may indicate that all changes to the database associated with transaction identifiers less than the minimum limit transaction identifier may be visible to the transaction, in one embodiment. The read view may also identify, in one embodiment, the low limit transaction identifier. For instance, the low limit transaction identifier may identify the maximum transaction identifier allocated (but not assigned to a transaction) for the database. The determined minimum transaction identifier (e.g., the may indicate a point in a logical ordering of transactions for the database (e.g., timestamps, sequence numbers, etc.), at which all transactions for the database may be visible when processing the transaction, and thus individual versions associated with the transactions that occurred prior to the minimum transaction identifier (e.g., less than the transaction id) do not have to be maintained. As indicated at 940, the entry in the data retention index may be updated with the minimum transaction identifier for the transaction, in some embodiments.

As indicated at 950, the transaction may be executed with respect to the database based on the consistent view of the database, in various embodiments. For example, if the transaction accesses a data record in the database that is changed by another transaction not visible to the transaction, then one or more undo records may be applied to the data record until that data record is a version of the data record that is visible to the transaction (e.g., by modifying the value(s) of the record or removing the record from visibility entirely), in one embodiment. Once the transaction commits or is rolled-back (e.g., due to a failure or conflicting transaction), then the entry in the data retention index may be cleared, as indicated at 960, to remove the minimum transaction identifier, in some embodiments. For instance, a null value or other indication may be written to the entry which a purge process may skip or ignore when evaluating the data retention index, in one embodiment. As indicated at 970, the key may be returned to the lock-free data structure, in various embodiments. For example, a push operation, similar to the pop operation described above may be performed to return the key to the lock-free stack for use by another process, in one embodiment.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
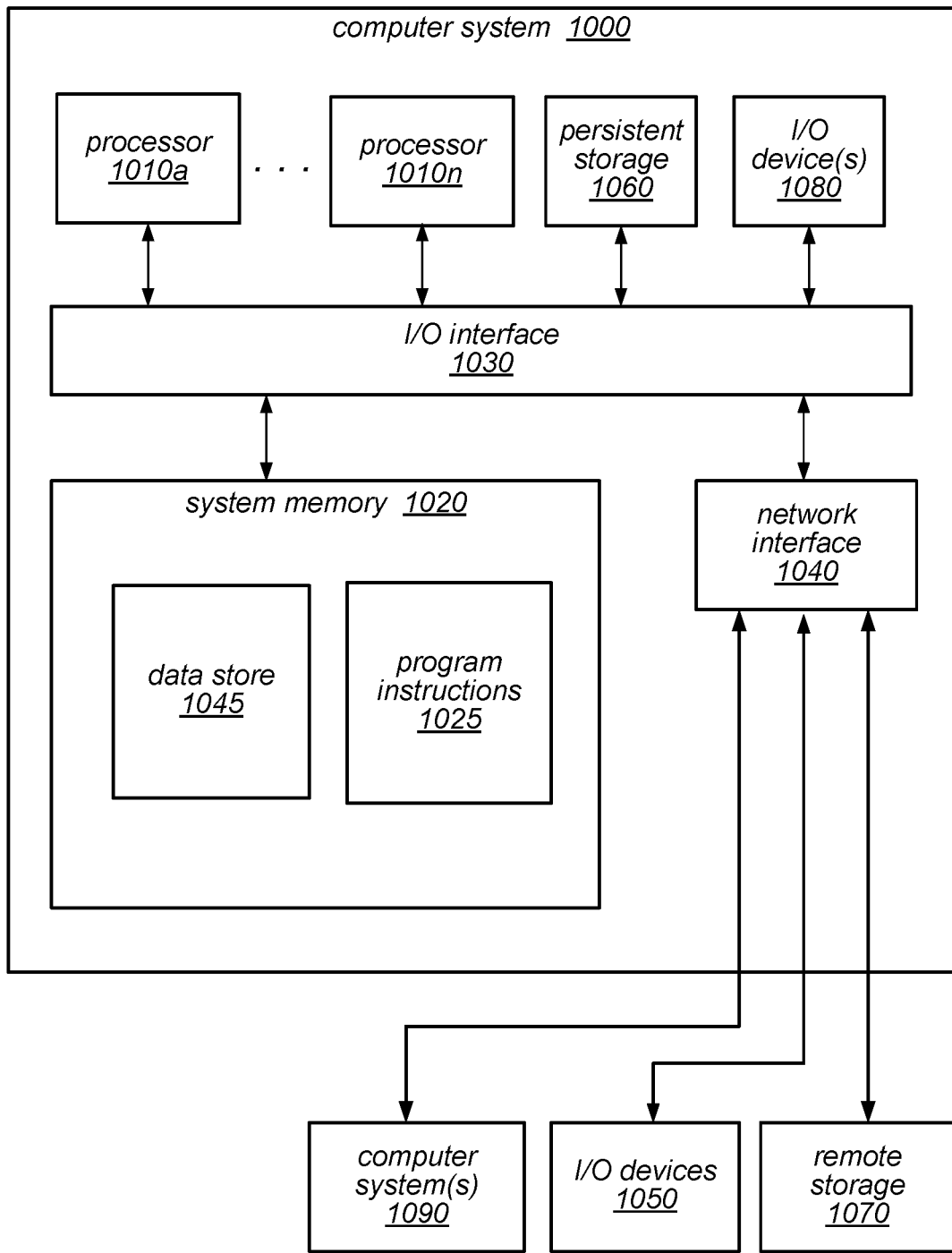
FIG. 10 is an example computer system, according to various embodiments.

FIG. 10 is a block diagram illustrating a computer system to implement lock-free updates to a data retention index, as well as various other systems, components, services or devices described above. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, computing node, or electronic device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor and a memory storing program instructions which, when performed by at least one processor, cause the at least one processor to perform a method to at least:
        access, by a plurality of processes, a lock-free data structure to obtain different keys identifying respective entries of a data retention index comprising a plurality of entries storing indications of data objects to retain, the data objects stored in a data store different from the data retention index, wherein the lock-free data structure is different from the data retention index and the data objects;

concurrently update, by at least a first process and a second process of the plurality of processes subsequent to obtaining the different keys, respective entries in the data retention index identified by the different keys to concurrently update indications of one or more of the data objects in the data store to retain; and reclaim one or more portions of the data store that store one or more other ones of the data objects not identified in the data retention index to be retained in the data store.

2. The system of claim 1, wherein the lock-free data structure is a lock-free stack, and wherein to obtain the different keys to the data retention index comprises perform a respective pop operation on the lock-free stack for each of the processes.

3. The system of claim 2, wherein the method further comprises:

for one of the processes:
update the entry identified by the key obtained by the one process to remove an indication of the one or more data objects from the entry in the data retention index; and perform a push operation to return the key to the lock-free stack.

4. The system of claim 1, wherein the at least one processor is a NUMA multi-core processor implementing a plurality of different virtual Central Processing Units (vCPUs) to execute the processes, wherein the memory and the least one processor are implemented as part of a network-based service and wherein the processes are executed in response to a client request receive via network interface at the network-based service.

5. A method, comprising:

providing a plurality of different processes with concurrent access to a data retention index comprising entries storing indications of data objects stored in a data store different from the data retention index, comprising:

accessing a lock-free data structure to obtain different keys identifying respective ones of the entries of the data retention index for the different processes, wherein the lock-free data structure is different from the data retention index and the data objects;

concurrently updating, subsequent to obtaining the different keys, the respective ones of the entries of the data retention index identified by the different keys to concurrently update indications of one or more of the data objects in the data store to retain;

evaluating the data retention index to determine one or more other ones of the data objects in the data store not indicated in the data retention index to be retained in the data store; and identifying portions of the storage that store the determined one or more other ones of the data objects for reclamation.

6. The method of claim 5, wherein the lock-free data structure is a lock-free stack, and wherein accessing the lock-free data structure to obtain the different keys of the data retention index for the different processes comprises performing a respective pop operation on the lock-free stack for each of the processes.

7. The method of claim 6, further comprising:
prior to providing the different processes with concurrent access to the data retention index, initializing the lock-free stack to store a number of nodes based, at least in part, on a maximum number of concurrently executing processes.

8. The method of claim 6, further comprising:
wherein the respective pop operation comprises performing an atomic compare and swap instruction;
for one of the processes:
updating the entry identified by the key obtained by the one process to remove an indication of the one or more data objects from the entry in the data retention index; and
performing a push operation to return the key to the lock-free stack, wherein the push operation comprises the atomic compare and swap instruction.

9. The method of claim 5,
wherein the one or more data objects are one or more log records stored in an undo log for a database in the data store, wherein the one or more log records are associated with respective transaction identifiers for transactions performed with respect to the database;
wherein the method further comprises detecting a purge event for the undo log, wherein the evaluating and the identifying are performed in response to the purge event; and
wherein evaluating the data retention index to determine one or more other data objects in the data store not indicated in the data retention index comprises:
evaluating other respective transaction identifiers stored in different entries of the data retention index to determine a minimum transaction identifier for retaining log records in the undo log from amongst the other respective transaction identifiers; and
identifying the respective transaction identifiers of the one or more undo log records as older than the minimum transaction identifier.

10. The method of claim 5, wherein the data store is a memory.

11. The method of claim 5, further comprising reclaiming the identified portions of the data store that store the determined one or more other data objects for storing other data.

12. The method of claim 5,
wherein the one or more data objects are one or more log records stored in an undo log for a database in the data store, wherein the one or more log records are associated with respective transaction identifiers for transactions performed with respect to the database, and wherein the different processes are executing other transactions directed to the database; and
wherein updating those entries of the data retention index identified by the different keys to indicate one or more data objects in the data store to retain comprises determining, for each of the processes, a minimum transaction identifier for providing a consistent view of the database to execute the transaction.

13. The method of claim 5, wherein the providing, the evaluating, and the identifying are performed by one or more computing nodes implemented as part of a network-based database service, wherein the processes are executing transactions with respect to a same database hosted in the network-based database service, and wherein a data volume storing data for the database is stored in a separate network-based storage service.

14. A non-transitory, computer-readable storage medium, storing program instructions that when executed by one or more computing devices cause the one or more computing devices to implement:

accessing, by a plurality of processes, a lock-free data structure to obtain different keys identifying respective entries of a data retention index, the data retention index comprising a plurality of entries storing indications of data objects to retain, the data objects stored in a data store different from the data retention index, wherein the lock-free data structure is different from the data retention index and the data objects;

concurrently updating, by at least a first process and a second process of the plurality of processes subsequent to obtaining the different keys, respective entries in the data retention index identified by the different keys to concurrently update indications of one or more of the data objects in the data store to retain;

evaluating the data retention index to determine one or more other ones of the data objects in the data store not indicated in the data retention index to be retained in the data store; and reclaiming one or more portions of the data store that store the determined one or more other ones of the data objects.

15. The non-transitory, computer-readable storage medium of claim 14, wherein the lock-free data structure is a lock-free stack, and wherein, in obtaining the different keys to the data retention index for the data store from the lock-free data structure, the program instructions cause the one or more computing devices to implement performing a respective pop operation on the lock-free stack for each of the processes.

16. The non-transitory, computer-readable storage medium of claim 15, wherein performing the respective pop operation comprises performing an atomic compare and swap instruction.

17. The non-transitory, computer-readable storage medium of claim 15, wherein the program instructions further cause the one or more computing devices to implement:

for one of the processes:
updating the entry identified by the key obtained by the one process to remove an indication of the one or more data objects from the entry in the data retention index; and
performing a push operation to return the key to the lock-free stack.

18. The non-transitory, computer-readable storage medium of claim 14, wherein the one or more data objects are one or more log records stored in an undo log for a database in the data store, wherein the one or more log records are associated with respective transaction identifiers for transactions performed with respect to the database;

wherein, in evaluating the data retention index to determine one or more other data objects in the data store not indicated in the data retention index, the program instructions cause the one or more computing devices to implement:

evaluating other respective transaction identifiers stored in different entries of the data retention index to determine a minimum transaction identifier for retaining log records in the undo log from amongst the other respective transaction identifiers; and
identifying the respective transaction identifiers of the one or more undo log records as older than the minimum transaction identifier.

19. The non-transitory, computer-readable storage medium of claim 14, wherein the one or more data objects are one or more log records stored in an undo log for a database in the data store, wherein the one or more log records are associated with respective transaction identifiers for transactions performed with respect to the database, and wherein the different processes are executing other transactions directed to the database; and wherein, in updating those entries of the data retention index identified by the different keys to indicate one or more data objects in the data store to retain, the program instructions cause the one or more computing devices to implement determining, for each of the processes, a minimum transaction identifier for providing a consistent view of the database to execute the transaction.

20. The non-transitory, computer-readable storage medium of claim 14, wherein the one or more computing devices respectively comprise at least one NUMA multi-core processor implementing a plurality of different virtual Central Processing Units (vCPUs) to execute the processes, wherein the one or more computing devices are implemented as part of a network-based service and wherein the processes are executed in response to a client request receive via network interface at the network-based service.

* * * * *